United States Patent [19]

Nguyen et al.

[11] Patent Number: 5,960,880
[45] Date of Patent: Oct. 5, 1999

[54] UNCONSOLIDATED FORMATION STIMULATION WITH SAND FILTRATION

[75] Inventors: Philip D. Nguyen; Jimmie D. Weaver, both of Duncan, Okla.; Hazim H. Abass, Caracas, Venezuela; Steven F. Wilson, Duncan, Okla.; Sanjay Vitthal, Lafayette, La.; R. Clay Cole, Duncan; Bobby K. Bowles, Comanche, both of Okla.

[73] Assignee: Halliburton Energy Services, Inc., Duncan, Okla.

[21] Appl. No.: 08/703,529

[22] Filed: Aug. 27, 1996

[51] Int. Cl.$^6$ .................................................. E21B 33/13
[52] U.S. Cl. ........................ 166/280; 166/281; 166/285; 166/295
[58] Field of Search ..................................... 166/280, 281, 166/283, 285, 294, 295

[56] References Cited

U.S. PATENT DOCUMENTS

| | | | |
|---|---|---|---|
| 3,343,600 | 9/1967 | Phansalkar et al. | |
| 3,525,398 | 8/1970 | Fisher | 166/288 |
| 3,608,639 | 9/1971 | Hart | 166/308 |
| 3,815,680 | 6/1974 | McGuire et al. | 166/281 |
| 3,854,533 | 12/1974 | Gurley et al. | 166/276 |
| 3,857,444 | 12/1974 | Copeland | 166/276 |
| 3,867,986 | 2/1975 | Copeland | 166/276 |
| 4,042,032 | 8/1977 | Anderson et al. | 166/276 |
| 4,070,865 | 1/1978 | McLaughlin | 61/36 C |
| 4,074,760 | 2/1978 | Copeland et al. | 166/276 |
| 4,336,842 | 6/1982 | Graham et al. | 166/276 |
| 4,649,998 | 3/1987 | Friedman | 166/294 |
| 4,829,100 | 5/1989 | Murphey et al. | 523/131 |
| 4,917,188 | 4/1990 | Fitzpatrick, Jr. | 166/295 |
| 5,058,676 | 10/1991 | Fitzpatrick et al. | 166/278 |
| 5,128,390 | 7/1992 | Murphey et al. | 523/130 |
| 5,381,864 | 1/1995 | Nguyen et al. | 166/280 |
| 5,492,178 | 2/1996 | Nguyen et al. | 166/276 |

*Primary Examiner*—Roger J. Schoeppel
*Attorney, Agent, or Firm*—Robert A. Kent; Clark Dougherty, Jr.

[57] ABSTRACT

The present invention provides methods of stimulating fluid production while preventing the migration of sand with produced fluids from an unconsolidated subterranean formation penetrated by a well bore. The methods basically comprise the steps of creating one or more fractures in the formation, injecting a hardenable resin composition into a portion of the formation through which the fractures extend whereby the portion of the formation is consolidated into a hard permeable mass and depositing proppant in the fractures to maintain the fractures open.

7 Claims, No Drawings

UNCONSOLIDATED FORMATION STIMULATION WITH SAND FILTRATION

BACKGROUND OF THE INVENTION

1. Field of the Invention

The present invention relates generally to improved methods for completing wells formed in unconsolidated formations, and more particularly, to methods of stimulating fluid production while preventing the migration of sand with produced fluids from such formations.

2. Description of the Prior Art

Oil and gas wells are often completed in unconsolidated formations containing loose or incompetent sands which migrate with produced fluids. The presence of sand particles in the produced fluids is undesirable in that the particles abrade pumping and other producing equipment and generally reduce the fluid production capability of the formations.

Incompetent subterranean formations include those which contain loose sands that are readily entrained by produced fluids and those wherein the particles making up the formations are bonded together with insufficient bond strength to withstand the forces produced by the intermittent production of fluids from the formations. An often used technique for minimizing sand production from such formations has been to produce fluids from the formations at low flow rates whereby the near well stability of sand bridges and the like in the formations is preserved. However, the collapse of such sand bridges often occurs as a result of unintentional high production rates and pressure surging.

Creating fractures in unconsolidated formations allows the formations to be produced with less pressure drawdown as compared to unfractured formations. Less pressure drawdown helps reduce the instability of the formation sand surfaces. However, the forces produced in the unconsolidated formations as a result of the above mentioned intermittent fluid production and shut-in causes sand bridges in the formations to become unstable and collapse.

Heretofore, unconsolidated formations have been treated by creating fractures in the formations and depositing proppant material in the fractures to maintain them in open positions. In addition, the proppant has heretofore been consolidated within the fractures into hard permeable masses to reduce the migration of sands through the fractures with produced fluids. Further, costly gravel packs with sand screens and the like have been installed in wells which serve as filters and assure that sand does not migrate with produced fluids into the well bores. However, since gravel packs, sand screens and the like filter out the sand, the presence of the filtered sand can add to the flow resistance thereby producing additional pressure drawdown which causes the fracture faces and other portions of the formation to break down and consolidated proppant in fractures, gravel packs and the like to be bypassed.

Thus, there is a need for improved methods of completing unconsolidated hydrocarbon producing formations whereby filter devices such as gravel packs and sand screens are not required and sand migration with produced fluids is prevented by other means.

SUMMARY OF THE INVENTION

The present invention provides improved unconsolidated formation stimulation and sand migration prevention methods which meet the needs described above and overcome deficiencies of the prior art. The methods basically comprise the steps of creating one or more fractures extending from the well bore into the formation, injecting a hardenable resin composition into a portion of the formation through which the fractures extend whereby that portion of the formation is consolidated into a hard permeable mass and depositing proppant in the fractures to maintain the fractures open which is preferably also consolidated into a hard permeable mass. The resulting formation includes fractures having consolidated permeable faces that do not readily break down and in combination with the proppant in the fractures, prevent the migration of sand with produced fluids without the need for filtering devices and the like.

In a preferred method of this invention, a hardenable resin composition is first injected into a portion of the incompetent formation adjacent to and around the well bore and allowed to harden whereby that portion of the formation is consolidated into a hard permeable mass thereby preventing sand migration into the well bore. One or more fractures are next created extending from the well bore through the consolidated portion of the formation into the unconsolidated portion thereof. Proppant coated with hardenable resin composition is deposited in the fractures and allowed to harden whereby the proppant is consolidated into a hard permeable mass. The propped fractures provide sand filtering flow channels from the unconsolidated portion of the formation to the well bore. The migration of sand with produced fluids to the well bore is effectively prevented without the use of gravel packs, sand screens and the like because the portion of the formation adjacent to and around the well bore is consolidated whereby it does not readily break down and the fractures extending into the unconsolidated portion of the formation contain consolidated proppant.

It is, therefore, a general object of the present invention to provide improved methods of stimulating fluid production while preventing the migration of sand with produced fluids from unconsolidated subterranean formations.

Other and further objects, features and advantages of the present invention will be readily apparent to those skilled in the art upon a reading of the description of preferred embodiments which follows.

DESCRIPTION OF PREFERRED EMBODIMENTS

The present invention provides improved methods of stimulating fluid production from an unconsolidated subterranean formation penetrated by a well bore while preventing the migration of sand with produced fluids from the formation. The methods, which do not involve the use of conventional gravel packs, sand screens and the like, include the steps of creating one or more fractures extending from the well bore into the unconsolidated formation, injecting a hardenable resin composition into a portion of the formation through which the fractures extend whereby that portion of the formation is consolidated into a hard permeable mass and depositing proppant in the fractures to maintain them in an open position.

As will be described further hereinbelow, the fractures can be created in the unconsolidated formation first followed by injecting a hardenable resin composition into the portion of the formation through which the fractures extend. Alternatively, the hardenable resin composition can be injected into a portion of the formation during the creation of the fractures or prior to fracturing the formation. It is generally preferred to first inject the hardenable resin composition into the formation adjacent to and around the well bore and to allow it to harden whereby that portion of the formation is consolidated into a hard permeable mass before creating and propping fractures in the formation.

The stimulation of subterranean formations by hydraulically fracturing the formations is well known to those skilled in the art. The creation of the fractures generally involves pumping a viscous fracturing fluid containing suspended particulate proppant into the formation at a rate and pressure whereby fractures are created therein. The continued pumping of the fracturing fluid extends the fractures in the formation and carries proppant suspended therein into the fractures. Upon the reduction of the flow of the fracturing fluid and the reduction in pressure exerted on the formation, the proppant is deposited in the fractures and the fractures are prevented from closing by the presence of the proppant therein.

Typical fracturing fluids which have been utilized heretofore include gelled water or oil base liquids, foams and emulsions. The foams utilized have generally been comprised of water based liquids containing one or more foaming agents foamed with a gas such as nitrogen. Emulsions formed with two or more immiscible liquids have also been utilized. A particularly useful emulsion for carrying out formation fracturing procedures is comprised of a water based liquid and a liquified, normally gaseous fluid such as carbon dioxide. Upon pressure release, the liquified gaseous fluid vaporizes and rapidly flows out of the formation.

The most common fracturing fluid utilized heretofore has been comprised of an aqueous liquid such as fresh water or salt water combined with a gelling agent for increasing the viscosity of the fluid. The increased viscosity reduces fluid loss and allows the fracturing fluid to transport significant concentrations of proppant into the created fractures.

A variety of gelling agents have been utilized including hydratable polymers which contain one or more of the functional groups such as hydroxyl, cis-hydroxyl, carboxyl, sulfate, sulfonate, amino or amide. Particularly useful such polymers are polysaccharide and derivatives thereof which contain one or more of the monosaccharide units galactose, mannose, glucoside, glucose, xylose, arabinose, fructose, glucuronic acid or pyranosyl sulfate. Natural hydratable polymers containing the foregoing functional groups and units include guar gum and derivatives thereof, locust bean gum, tara, konjak, tamarind, starch, cellulose and derivatives thereof, karaya, xanthan, tragacanth and carrageenan. Hydratable synthetic polymers and copolymers which contain the above mentioned functional groups and which have been utilized heretofore include polyacrylate, polymethacrylate, polyacrylamide, maleic anhydride, methylvinyl ether polymers, polyvinyl alcohol and polyvinylpyrolidone.

Preferred hydratable polymers which yield high viscosities upon hydration, i.e., apparent viscosities in the range of from about 10 centipoises to about 90 centipoises at concentrations in the range of from about 10 pounds per 1,000 gallons to about 80 pounds per 1,000 gallons in water, are guar gum and guar derivatives such as hydroxypropylguar and carboxymethylguar, cellulose derivatives such as hydroxyethylcellulose, carboxymethylcellulose and carboxymethylhydroxyethylcellulose, locust bean gum, carrageenan gum and xanthan gum.

The viscosities of aqueous polymer solutions of the types described above can be increased by combining cross-linking agents with the polymer solutions. Examples of cross-linking agents which can be utilized are multi-valent metal salts or compounds which are capable of releasing the metal ions in an aqueous solution. Examples of such multi-valent metal ions are chromium, zirconium, antimony, titanium, iron (ferrous or ferric), zinc or aluminum.

The above described gelled or gelled and cross-linked fracturing fluids can also include gel breakers such as those of the enzyme type, the oxidizing type or the acid buffer type which are well known to those skilled in the art. The gel breakers cause the viscous fracturing fluid to revert to thin fluids that can be produced back to the surface after they have been used to create fractures and carry proppant in a subterranean formation.

As mentioned above, particulate proppant material is suspended in the viscous fracturing fluid so that it is carried into the created fractures and deposited therein when the flow rate of the fracturing fluid and the pressure exerted on the fractured subterranean formation are reduced. The proppant functions to prevent the fractures from closing due to overburden pressures, i.e., to prop the fractures open, whereby produced fluids can flow through the fractures. Also, the proppant is of a size such that sand migrating with produced fluids is prevented from flowing through the flow channels formed by the fractures, i.e., the proppant screens out the migrating sand. Various kinds of particulate materials can be utilized as proppant in accordance with the present invention including sand, bauxite, ceramic materials, glass materials and teflon materials. The particulate material used can have a particle size in the range of from about 2 to about 400 mesh, U.S. Sieve Series. The preferred particulate material is sand having a particle size in the range of from about 10 to about 70 mesh, U.S. Sieve Series. Preferred sand particle size distribution ranges are one or more of 10–20 mesh, 20–40 mesh, 40–60 mesh or 50–70 mesh, depending on the particle size and distribution of the formation sand to be screened out by the proppant.

The hardenable resin compositions which are useful in accordance with the present invention are generally comprised of a hardenable organic resin and a resin-to-sand coupling agent. A number of such compositions are described in detail in U.S. Pat. No. 4,042,032 issued to Anderson et al. on Aug. 16, 1977, U.S. Pat. No. 4,070,865 issued to McLaughlin on Jan. 31, 1978, U.S. Pat. No. 5,058,676 issued to Fitzpatrick et al. on Oct. 22, 1991 and U.S. Pat. No. 5,128,390 issued to Murphey et al. on Jul. 7, 1992, all of which are incorporated herein by reference. The hardenable organic resin used is preferably a liquid at 80° F., and is cured or hardened by heating or by contact with a hardening agent.

Examples of hardenable organic resins which are suitable for use in accordance with this invention are novolak resins, polyepoxide resins, polyester resins, phenol-aldehyde resins, urea-aldehyde resins, furan resins and urethane resins. These resins are available at various viscosities, depending upon the molecular weight of the resin. The preferred viscosity of the organic resin used in accordance with this invention is in the range of from about 1 to about 1000 centipoises at 80° F. However, as will be understood by those skilled in the art, resins of higher viscosities can be utilized when mixed or blended with one or more diluents. Examples of suitable diluents for polyepoxide resins are styrene oxide, octylene oxide, furfuryl alcohol, phenols, furfural, liquid monoepoxides such as allyl glycidyl ether, and liquid diepoxides such as diglycidyl ether or resorcinol. Examples of such diluents for furfuryl alcohol resins, phenol-aldehyde resins and urea-aldehyde resins include, but are not limited to, furfuryl alcohol, furfural, phenol and cresol. Diluents which are generally useful with all of the various resins mentioned above include phenols, formaldehydes, furfuryl alcohol and furfural.

The resin to sand coupling agent is utilized in the hardenable resin compositions to promote coupling or adhesion to sand and other silicious materials in the formation to be treated. A particularly suitable such coupling agent is an aminosilane compound or a mixture of aminosilane compounds selected from the group consisting of N-β-(aminoethyl)-γ-aminopropyltrimethoxysilane, N-β-(aminoethyl)-N-β-(aminoethyl)-γ-aminopropyltrimethoxysilane, N-β-(aminopropyl)-N-β-(aminobutyl)-γ-aminopropyltriethoxysilane and N-β-(aminopropyl)-γ-aminopropyltriethoxysilane. The most preferred coupling agent is N-β-(aminoethyl)-γ-aminopropyl-trimethoxysilane.

As mentioned, the hardenable resin composition used is caused to harden by contacting the resin with a hardening agent. The hardening agent can be included in the resin composition (internal hardening agents) or the resin composition can be contacted with the hardening agent after the resin composition has been placed in the subterranean formation to be consolidated (external hardening agents).

An internal hardening agent is selected for use that causes the resin composition to harden after a period of time sufficient for the resin composition to be placed in a subterranean zone or formation. Retarders or accelerators to lengthen or shorten the cure times are also utilized. When an external hardening agent is used, the hardenable resin composition is first placed in a zone or formation to be consolidated followed by an overflush solution containing the external hardening agent.

Suitable internal hardening agents for hardening resin compositions containing polyepoxide resins include, but are not limited to, amines, polyamines, amides and polyamides. A more preferred internal hardening agent for polyepoxide resins is a liquid eutectic mixture of amines and methylene dianiline diluted with methyl alcohol. Examples of internal hardening agents which can be used with resin compositions containing furan resins, phenol-aldehyde resins, urea-aldehyde resins and the like are hexachloroacetone, 1,1,3-trichlorotrifluoroacetone, benzotrichloride, benzylchloride and benzalchloride.

Examples of external hardening agents for consolidating furan resins, phenol-aldehyde resins and urea-aldehyde resins are acylhalide compounds, benzotrichloride, acetic acid, formic acid and inorganic acids such as hydrochloric acid. Generally, hardening agents selected from the group consisting of inorganic acids, organic acids and acid producing chemicals are preferred. The hardenable resin compositions can also include surfactants, dispersants and other additives well known to those skilled in the art.

As mentioned above, the proppant utilized in the fracturing step is preferably sand, but other particulate materials can also be utilized. The proppant size and distribution are carefully selected in accordance with the size and distribution of the formation sand and the proppant is preferably coated with a hardenable resin composition of the type described above. The resin coated proppant can be prepared in accordance with conventional batch mixing techniques which are well known to those skilled in the art followed by the suspension of the resin coated proppant in the fracturing fluid utilized. Alternatively, the fracturing fluid containing resin coated proppant can be prepared in a substantially continuous manner such as in accordance with the methods disclosed in U.S. Pat. No. 4,829,100 issued on May 9, 1989 to Murphey et al. or U.S. Pat. No. 5,128,390 issued on Jul. 7, 1992 to Murphey et al., both of which are incorporated herein by reference.

In one embodiment of the present invention, the unconsolidated formation to be treated is fractured and the poorly consolidated or unconsolidated faces of the fractures formed are consolidated after or during the fracturing procedure. The consolidation of the fracture faces prevents produced formation sand from entering the fractures. In accordance with this method, the unconsolidated formation is initially fractured and non-coated or coated proppant is deposited in the created fractures. Simultaneously with the creation of the fractures and placement of the proppant or following the creation of the fractures and placement of the proppant, a hardenable resin composition is injected into the fractures. The resin composition is allowed to flow into the fracture faces and adjacent unconsolidated formation to a distance from the fracture faces of from about 0.01 inch to about 100 inches. As will be understood, one or more fluid loss control agents can be combined with the resin composition to attain its distribution over and penetration into the entire surface areas of the fracture faces. An internal or external hardening agent is used to cause the resin composition to subsequently harden whereby the fracture faces and adjacent unconsolidated formation as well as the proppant are consolidated into hard permeable masses. In carrying out this embodiment of the present invention, a hardenable resin composition comprising a furan resin is preferably utilized which is hardened by contact with a hydrochloric acid hardening agent.

In another more preferred embodiment of the present invention, a hardenable resin composition is first injected into the portion of the formation adjacent to and around the well bore and allowed to harden therein whereby that portion of the unconsolidated formation is consolidated into a hard permeable mass. One or more fractures are next created in the formation extending from the well bore through the consolidated portion of the formation into the unconsolidated portion thereof. Hardenable resin coated composition proppant is deposited in the fractures and allowed to harden whereby the proppant is consolidated into a hard permeable mass. The fracturing fluid and resin coated proppant displacement procedure preferably also includes injecting resin composition through the fracture faces into the formation adjacent thereto and allowing the fracture faces and adjacent formation to also be consolidated into hard permeable masses. The consolidated portion of the formation adjacent and around the well bore functions as a sand filter between the well bore and the unconsolidated portion of the formation and the fractures containing permeable consolidated proppant function as filtering flow channels which prevent the migration of sand from the unconsolidated portion of the formation through the flow channels.

Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. A method of stimulating fluid production while preventing the migration of sand with produced fluids from an unconsolidated subterranean formation penetrated by a well bore comprising the steps of:

creating one or more fractures extending from said well bore into said formation;

injecting a hardenable resin composition comprising a polyepoxide resin together with an internal hardening agent comprising a liquid eutectic mixture of amines and methylene dianiline diluted with methyl alcohol into a portion of said formation through which said fractures extend whereby said portion of said formation is consolidated into a hard permeable mass; and depositing proppant in said fractures to maintain said fractures open.

2. The method of claim 1 wherein said hardenable resin composition is injected into said formation after said fractures are created.

3. The method of claim 1 wherein said proppant deposited in said fractures is coated with said hardenable resin composition whereby said proppant is consolidated into a hard permeable mass.

4. The method of claim 1 wherein said hardenable resin composition is injected into said formation during the creation of said fractures.

5. The method of claim 1 wherein said fractures are created by pumping a fracturing fluid into said formation at a sufficient rate and pressure to fracture said formation.

6. The method of claim 1 wherein said proppant is selected from the group consisting of sand, bauxite, ceramic materials, glass materials and teflon materials.

7. The method of claims 1 or 6 wherein said proppant has a particle size in the range of from about 2 to about 400 mesh.

* * * * *